(12) United States Patent
Nishimura et al.

(10) Patent No.: US 7,693,159 B2
(45) Date of Patent: Apr. 6, 2010

(54) METHOD, TERMINAL AND ROUTER FOR DETECTION OF TRIGGER TO REROUTING

(75) Inventors: Kenji Nishimura, Yokosuka (JP); Ken Igarashi, Yokohama (JP); Shin-ichi Isobe, Yokosuka (JP); Atsushi Iwasaki, Yokosuka (JP); Takashi Koshimizu, Yokosuka (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 1701 days.

(21) Appl. No.: 10/341,387

(22) Filed: Jan. 14, 2003

(65) Prior Publication Data

US 2003/0142660 A1    Jul. 31, 2003

(30) Foreign Application Priority Data

Jan. 30, 2002    (JP)    ............... 2002-022469

(51) Int. Cl.
*H04L 12/28* (2006.01)
(52) U.S. Cl. .................. 370/401; 370/392; 455/445
(58) Field of Classification Search ................ 370/401, 370/392; 455/445
See application file for complete search history.

(56) References Cited

U.S. PATENT DOCUMENTS

| | | | |
|---|---|---|---|
| 5,590,126 A * | 12/1996 | Mishra et al. | ............... 370/329 |
| 6,347,078 B1 * | 2/2002 | Narvaez-Guarnieri et al. | .... 370/230 |
| 6,973,023 B1 * | 12/2005 | Saleh et al. | .................. 370/217 |
| 2003/0026241 A1 * | 2/2003 | Ono et al. | ..................... 370/349 |
| 2003/0056007 A1 * | 3/2003 | Katsube et al. | ............. 709/238 |

FOREIGN PATENT DOCUMENTS

| | | |
|---|---|---|
| EP | 0935368 | 8/1999 |
| EP | 0996304 | 4/2000 |
| JP | 2000-032063 | 1/2000 |

OTHER PUBLICATIONS

"3$^{rd}$ Generation Partnership Project; Technical Specification Group Radio Access Network; Manifestations of Handover and SRNS Relocation (3G TR 25.832 version 3.0.0)" Technical Specification.
Sungmin Choe, et al., "Rerouting scheme for handoff in wireless ATM" Electronic Letters, vol. 34, No. 11, May 28, 1998.

* cited by examiner

*Primary Examiner*—Duc C Ho
(74) *Attorney, Agent, or Firm*—Crowell & Moring LLP (57) ABSTRACT

Rerouting of packet exchanges by a mobile terminal is controlled so as to be optimized on a real time basis to prevent network resources from being wasted by redundant routing. In an initial state a route of data from a mobile communication terminal M to a CN 8, which is a communication partner, is a route R5. Then, an access router (AR) 72 acquires the number of hops of data received from the CN 8 by the mobile communication terminal M. As the mobile communication terminal M now performs a handover to under the command of the AR 73, the route will change to a route R9. Then the AR 73 detects that the route becomes redundant by the fact that the number of hops acquired after the shift is greater than the pre-shift number of hops received from the AR 72, and invokes control to reroute to a route R7, which provides the optimal routing.

11 Claims, 6 Drawing Sheets

METHOD, TERMINAL AND ROUTER FOR DETECTION OF TRIGGER TO REROUTING

BACKGROUND OF THE INVENTION

1. Field of the Invention

The present invention relates to a method, a terminal and a router for detecting a trigger to rerouting, and more particularly to a method, a terminal and a router for detecting a trigger to rerouting for controlling an alteration of redundant routing.

2. Description of the Related Art

In the conventional packet exchange control system (GPRS) standardized under the 3rd Generation Partnership Project (3GPP), a manner of controlling the rerouting of a communicating mobile terminal when it has moved is differentiated with the type of radio channel between the mobile terminal and the base transceiver station during call. That is, available radio channels between the mobile terminal and the base transceiver station are classified into "dedicated channels" on which the volume of communication traffic is heavy and "common channels" on which the traffic volume is light. On the dedicated channel, the radio network controller (RNC) used at the time of initial establishment of communication is used as the anchor. And control to extend the route of data from the anchor (subscriber line extension) is performed. On the common channel, the Gateway GPRS Support Node (GGSN) is used as the anchor, from which routing is switched to the shortest cut from there to the mobile terminal (SRNS relocation (SRNS=Serving Radio Network Subsystem)) is performed. (Reference: 3G TS 25.832 "Manifestations of Handover and SRNS Relocation".) This rerouting control is performed when the mobile terminal moves from one RNC to another (inter-RNC handover), but this rerouting control is not performed when the mobile terminal moves from one base transceiver station (BTS) to another in the territory of the same RNC (intra-RNC handover). In an intra-RNC handover, the route from the RNC to the BTS can be switched by soft handover, but that at a higher level than the RNC (between the RNC and the GGSN) cannot be switched.

When a mobile terminal performs an inter-RNC handover under the conventional rerouting control by GPRS, optimal rerouting can be accomplished if the radio channel is a common channel, but if it is a common channel, the subscriber line extension entails the occurrence of a redundant portion on the route, resulting in wasteful use of network resources. Moreover, as the choice between subscriber line extension and optimal rerouting solely relies on whether the radio channel is a dedicated channel or a common channel, even if an inter-RNC handover takes place, subscriber line extension may be chosen (if the volume of traffic drops in this state and a shift to a common channel occurs, a change to optimal routing will take place upon that shift), there is a disadvantage that the redundant routing resulting from the movement of the mobile unit cannot be optimized on a real time basis. Furthermore, although SRNS relocation is permitted under the 3GPP standard specifications even when operating on a dedicated channel, essentially SRNS relocation (or subscriber line extension) is a technique that is made feasible by the capability of the network to keep track of whether a mobile terminal has moved from one RNC to another. In a usual IP network, as there are many different topologies including a mesh structure and a tree structure or the like and the structure can usually be altered as desired, it is not realistic for the network to manage the structure, and it is impossible to apply the 3GPP specifications as they are.

Figure 7A:
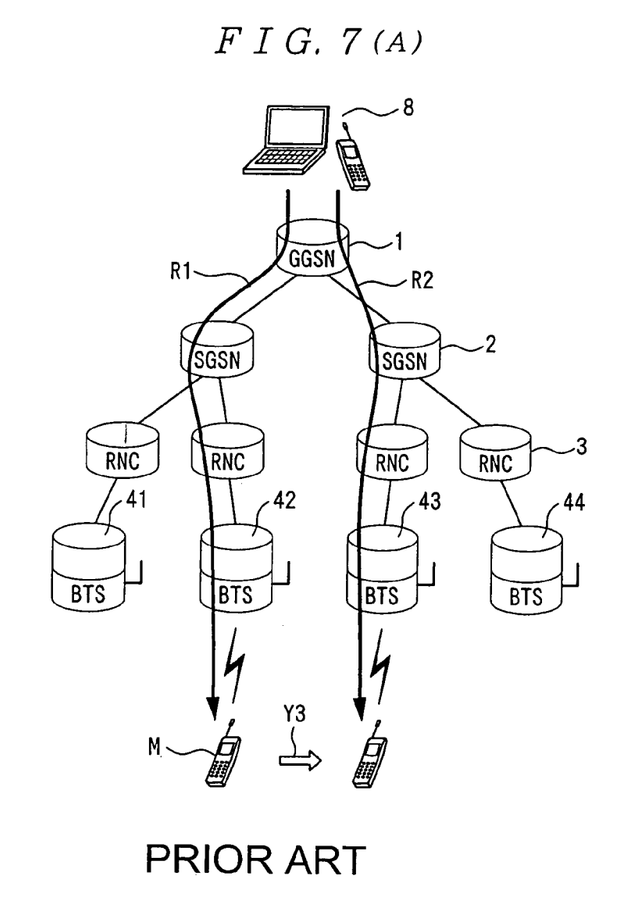
FIG. 7A illustrates how routing takes place if a radio channel between a mobile communication terminal and a base transceiver station is a common channel in a conventional GPRS system.
Figure 7B:
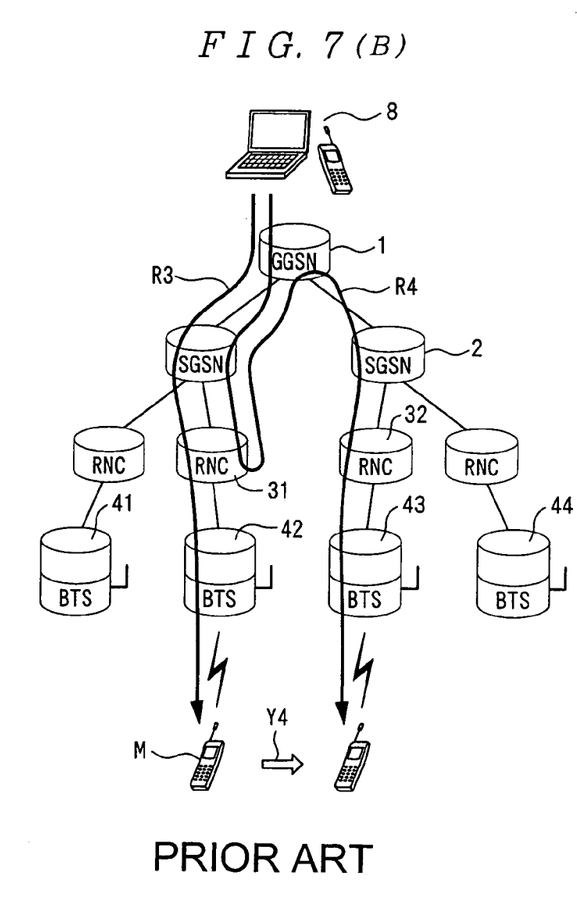
FIG. 7B, how routing takes place if the radio channel between the mobile communication terminal and the base transceiver station is a dedicated channel in the conventional GPRS system.

FIGS. 7 illustrate how the conventional system works, namely how routing is altered where a mobile communication terminal M under GPRS shifts its position. FIG. 7A shows a case in which the radio channel between the mobile communication terminal M and the base transceiver station is a common channel, and FIG. 7B, a case in which the radio channel between the mobile communication terminal M and the base transceiver station is a dedicated channel. A GGSN 1 in FIG. 7A is a gateway GPRS support node, positioned at the gateway to the network where there is a server or a terminal which is to become a communication partner 8 with the mobile communication terminal M. Communication between the mobile communication terminal M and the communication partner 8 takes place via this GGSN 1. An SGSN 2 is a Serving GPRS Support Node (SGSN), which is connected to the GGSN 1 and is the switchboard nearest to the mobile communication terminal M. An RNC 3 is a radio network controller having functions to control radio resources and to control the handover when the mobile communication terminal M has shifted its position. BTSs 41 to 44 are base transceiver stations, and the mobile terminal carries out communication through connection to one or another of these BTSs.

Where the radio channel between the mobile communication terminal M and the base transceiver station is a common channel as shown in FIG. 7A, the communication path between the mobile communication terminal M and its communication partner 8 is switched from a route R1 to a route R2, which is the shortest cut, with the GGSN 1 as the starting point along with a shift, represented by an arrow Y3, of the mobile communication terminal M. However, where the radio channel is a dedicated channel as shown in FIG. 7B, subscriber line extension takes place whereby, starting from an RNC 31 which was on the communication path when communication was begun, a route R3 is extended toward an RNC 32 and a BTS43, which are the destinations of the shift, in the direction represented by an arrow Y4, of the mobile communication terminal M (a route R4). This system is used to restrain any data loss that may arise when the communication path is switched by a handover, but a more redundant route shown in FIG. 7B will arise, compared with the optimal (shortest) route (the route R2 in FIG. 7A).

Thus under GPRS, even at a timing at which rerouting for optimization is required, the rerouting method is selected solely dependent on the state of the radio channel, resulting in a disadvantage that routing cannot be optimized on a real time basis in response to a handover of the mobile communication terminal M.

Conceivably, this problem could be addressed by either (1) invoking the procedure of change-over to the optimal route upon every handover of the mobile terminal or (2) invoking the same upon an inter-RNC handover.

However, the method of (1) may invoke a wasteful procedure because an intra-RNC handover would need no optimization of routing (the handover would give rise to no redundant route). The method of (2) is unrealistic because managing the structure of a usual IP network, such as the one mentioned above, is difficult to manage and accordingly it is difficult to determine whether or not a given RNC is an "inter-RNC".

SUMMARY OF THE INVENTION

An object of the present invention is to provide a method, a terminal and a router for detecting a trigger to rerouting for providing on a real time basis a trigger to anchor router (hereinafter abbreviated to "AncR") reselection by constantly comparing during communication the number of hops required for the routing of a data packet from the communication partner of a mobile terminal to the mobile terminal.

A method of detecting a trigger to rerouting is characterized by including a comparative step of comparing the respective numbers of hops arising at terminals in data transmission and reception arising between the terminals, and an optimizing step of achieving optimization, if the result of comparison at the comparative step indicates that the number of hops in later data transmission and reception is greater, by altering the routing so as to reduce the number of hops.

By comparing the numbers of hops on the route, any redundancy on the route can be detected according to an increase in the number of hops, and the route can be optimized on that basis.

In various embodiments discussed below, routing in the transmission and reception of the data is accomplished with at least one of a plurality of routers relaying the data serves as the anchor, if the number of hops in later data transmission and reception is found greater as the result of comparison at the comparative step, the router to serve as this anchor (anchor router) is altered at the optimizing step.

The numbers of hops between transmission terminal transmitting data and reception terminal receiving the data are compared at the comparative step, and the routing is altered at the optimizing step according to the result of comparison at the comparative step.

As the numbers of hops are compared and a rerouting instruction is issued on the part of a specific party to communication, the optimal rerouting can be accomplished without having to grasp the overall situation of the communication network including the identification of the source of redundancy as the shift of the own terminal or that of the other party to the terminal or any other factor.

The number of hops of the currently received data at the reception terminal and the number of hops of the immediately preceding received data at the reception terminal are compared at the comparative step, and routing is altered at the optimizing step so as to reduce the number of hops if the result of comparison at the comparative step reveals that the number of hops of the currently received data is greater than the number of hops of the immediately preceding received data.

By monitoring the number of hops every time data are received, the optimal rerouting can be accomplished on a substantially real time basis while the mobile terminal is engaged in communication.

The number of hops is acquired by acquiring on the basis of parameters in data, the parameters being modified by routers which are passed between the transmission terminal and the reception terminal during the time they communicate, the variances between the values of the parameters at the starting point of counting and the values of the parameters at the ending point of counting, and identifying the number of routers corresponding to those variances.

This makes it possible to acquire the number of hops in data reception. Further by using parameters contained in the data, it is made possible to acquire the number of hops on a substantially real time basis along with the transmission and reception of data and without having to perform any special control over the communication of parameters.

The parameters are initialized at the starting point, and the variances can be acquired on the basis of the resultant initial values.

This makes it possible to acquire the number of hops accurately.

A terminal according to the invention includes an acquiring unit which acquires the number of hops and an issuing unit which issues, if the number of hops currently acquired by the acquiring unit is greater than the number of hops acquired in the past, an optimizing instruction to alter routing to the other terminal to reduce the number of hops and optimize it, it being so arranged that an external apparatus having received the instruction optimizes the inter-terminal routing.

A router according to the invention includes an acquiring unit which acquires the number of hops and an issuing unit which issues, if the number of hops currently acquired by the acquiring unit is greater than the number of hops acquired in the past, an optimizing instruction to alter the inter-terminal routing to reduce the number of hops and optimize it, it being so arranged that an external apparatus having received the instruction optimizes the inter-terminal routing.

The router may further include a receiver unit which receives the number of hops acquired by another apparatus in the past, wherein the issuing unit issues, if the number of hops currently acquired by the acquiring unit is greater than the past number of hops acquired by the receiver unit, an optimizing instruction to alter the inter-terminal routing to reduce and optimize it, and an external apparatus having received the instruction optimizes the inter-terminal routing.

The router may further include a transmitter unit which transmits the number of hops acquired by the acquiring unit to an external comparator which detects any increase in the number of hops in the inter-terminal communication on the basis of the acquired number of hops.

An embodiment of a router of the invention includes an initializing unit which initializes parameters in data modified by a router installed between the terminals for the communication of data to identify the number of hops, wherein the variances of said parameters matching said number of hops can be acquired on the basis of the resultant initialized values.

DETAILED DESCRIPTION OF THE PREFERRED EMBODIMENTS

Preferred embodiments of the present invention will be described below with reference to the accompanying drawings. In the following description, equivalent elements in different drawings are denoted by respectively the same reference signs.

Embodiment 1

Figure 1:
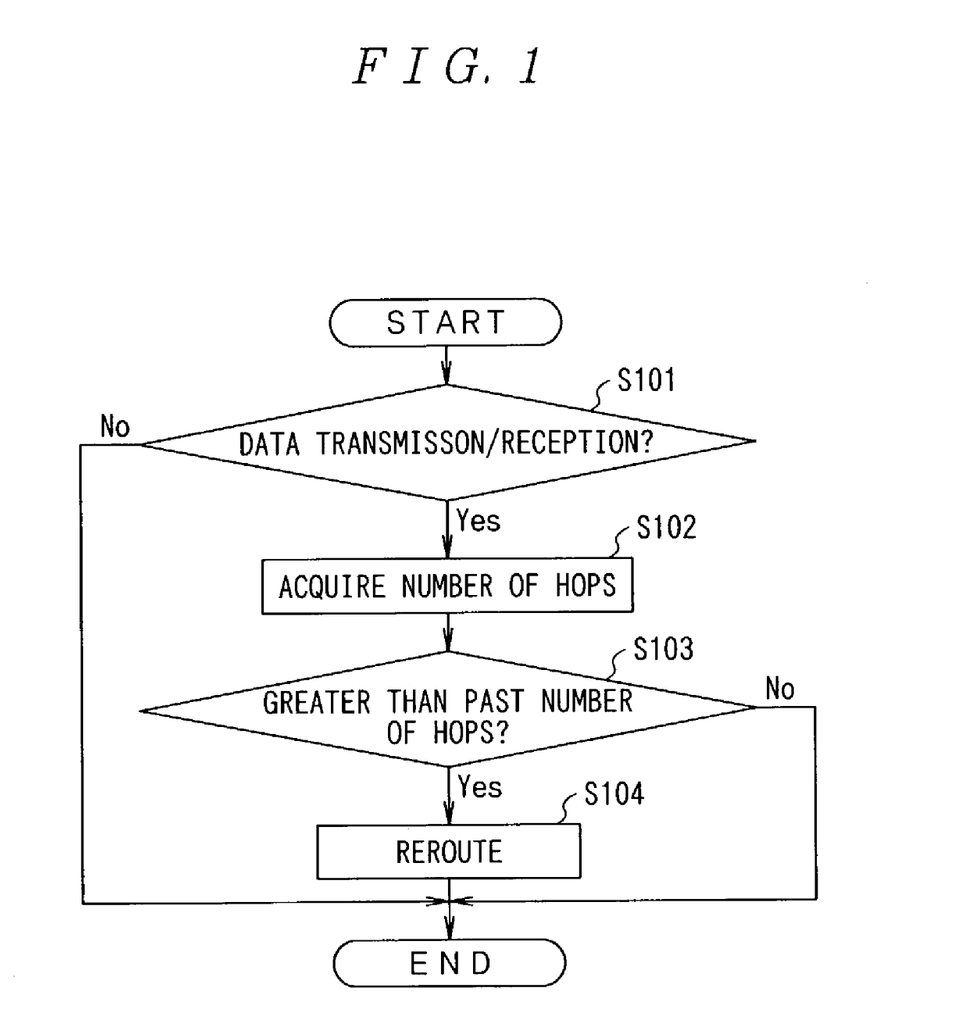
FIG. 1 is a flow chart of a method of detecting a trigger to rerouting according to the present invention.

FIG. 1 is a flow chart of a method of detecting a trigger to rerouting according to the present invention.

At step S101 in FIG. 1, transmission and reception of data between specific terminals is monitored.

At step S102, if transmission and reception of any data was detected at step S101, the number of routers the data have passed from the time they were transmitted from one terminal by the time they are received by another terminal, which is the communication partner, i.e. the number of hops, is acquired.

At step S103, the number of hops acquired at step S102 is compared with the number of hops acquired by earlier transmission and reception of data than at step S101. If this comparison reveals a greater number of hops at step S102, i.e. that the shift of the communicating terminal in the meantime has made the routing redundant, the process goes ahead to step S104.

At step S104, rerouting is carried out so as to reduce the number of hops.

Figure 2:
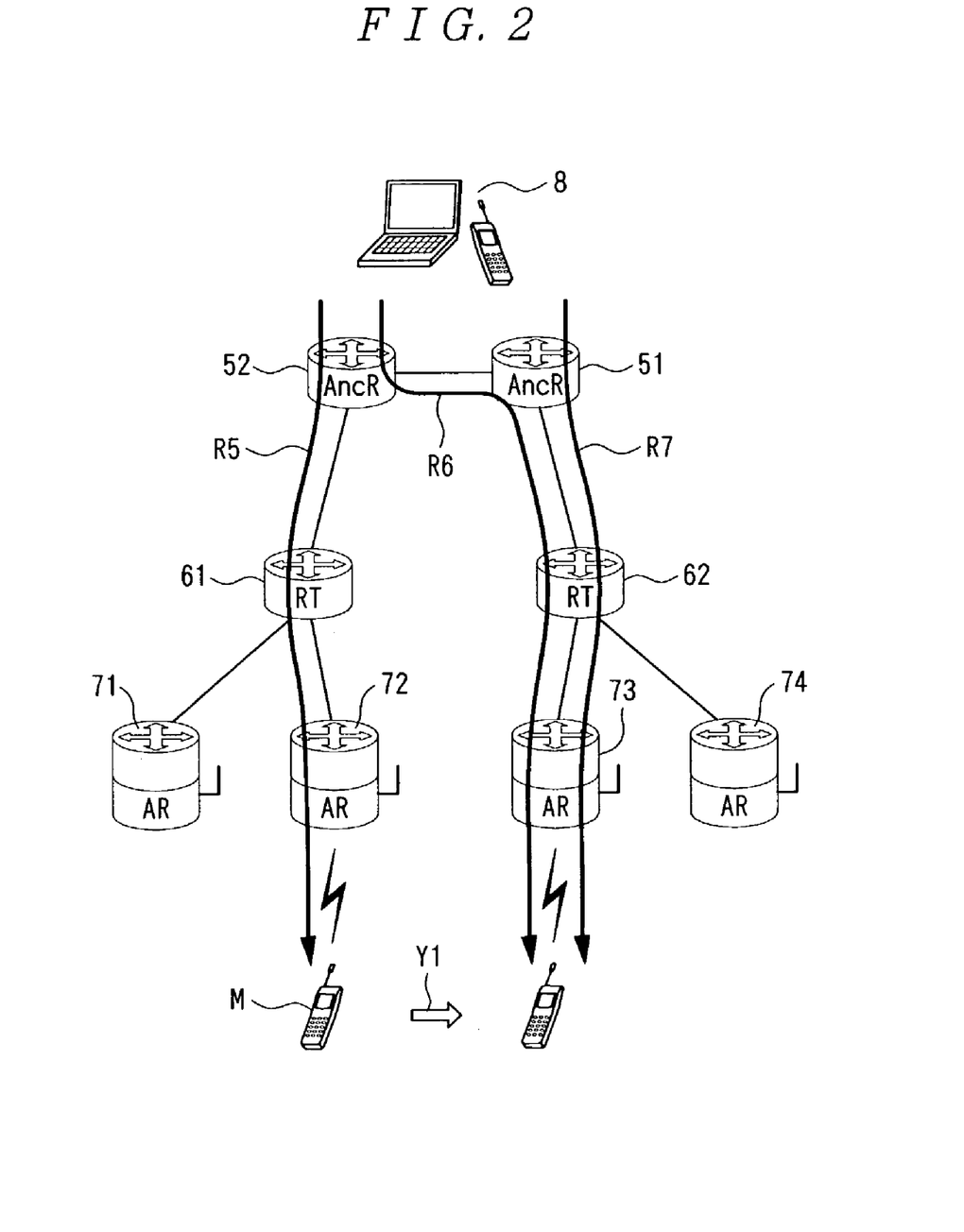
FIG. 2 illustrates how routing takes place if the method of detecting a trigger to rerouting according to the invention is applied to a case in which a correspondent node (CN) is in another network.

FIG. 2 illustrates how routing takes place if the method of detecting a trigger to rerouting according to the invention is applied to a case in which a correspondent node (CN), with which a mobile terminal communicates, is in another network (hereinafter referred to as the other network) than the network to which the mobile terminal belongs (hereinafter referred to as the own network).

A CN 8 in this case may be a mobile terminal connected to the other network or any other terminal or a server. AncRs 51 and 52 are routers present on the route between the mobile communication terminal M and the CN 8, and communication takes place via them. The AncR 51 in Embodiment 1 usually is likely to be a router present on the boundary between the own network and the other network. The AncR 51 further has a function to capsulate a data packet destined from the CN 8 for the mobile communication terminal M when it passes and to transmit it to the mobile communication terminal M and a function to set in that data packet the initial number of hops in the form of combining consciousness with an access router (AR). RTs 61 and 62 are usual routers (RTs) present in the network. ARs 71 through 74 are routers present at one end or another of the network, and the mobile communication terminal M connects with the AR 72 among them and engages in wireless communication with the AR 72.

FIG. 2 shows a situation in which the mobile communication terminal M is already connected to the AR 72 before a handover. The routing of a data packet from the CN 8 to the mobile communication terminal M then consists of a route R5 via the AncR 52. The data packet from the CN 8 is capsulated by the AncR 52, and the number of hops is initialized and transmitted to the mobile communication terminal M. The AR 72 detects from the received data packet (destined for the mobile terminal) the number of hops required between the CN 8 and the AR 72 on the basis of the initial number of hops set by the AncR 52, and stores that number.

When the mobile communication terminal M shifts to under the command of the AR 73 as indicated by an arrow Y1 and a handover takes place, immediately after the handover it is routed via a route R6 because it is still communicating via the AncR 52. At the time of this handover, information regarding the number of hops of the reception data of the mobile communication terminal M, acquired and stored by the AR 72, is succeeded and stored by the AR 73. The optimal (shortest) path then is a route R7, and the route R6 would be a redundant path for routing from the CN 8 to the AncR 51 via the AncR 52. Then the AR 73 compares the number of hops between the CN 8 and the AR 72 at the AR 72 via the route R5, succeeded from the AR 72, with the number of hops between the CN 8 and the AR 73 detected when on the route R6, and detects an increase in the number of hops.

Triggered by this detection, the AR 73 invokes control to optimize the route, i.e. to reselect an AncR. In the state shown in FIG. 2, as the route using the AncR 51 as the relay node is the shortest cut, control to select the AncR 51 as the relay node is invoked. A number of ways of AncR reselection control are conceivable, including direct notification by the AR 73 to the CN 8 that the subsequent communication will take place via the AncR 51, and a request by the AR 73 to the AncR, another router or mobile terminal to notify the CN 8 of the reselection. After the AncR reselection, the routing is changed to the route R7 having the AncR 51 as its relay node, resulting in a switch to the optimal route. Various specific means are conceivable for handing over the data of the number of hops from the AR 72 to the AR 73 in this embodiment, including direct transmission of the data from the AR 72 to the AR 73, transmission of the data via another node (router) in the network, and transmission of the data via the pertinent mobile terminal.

Embodiment 2

Figure 3:
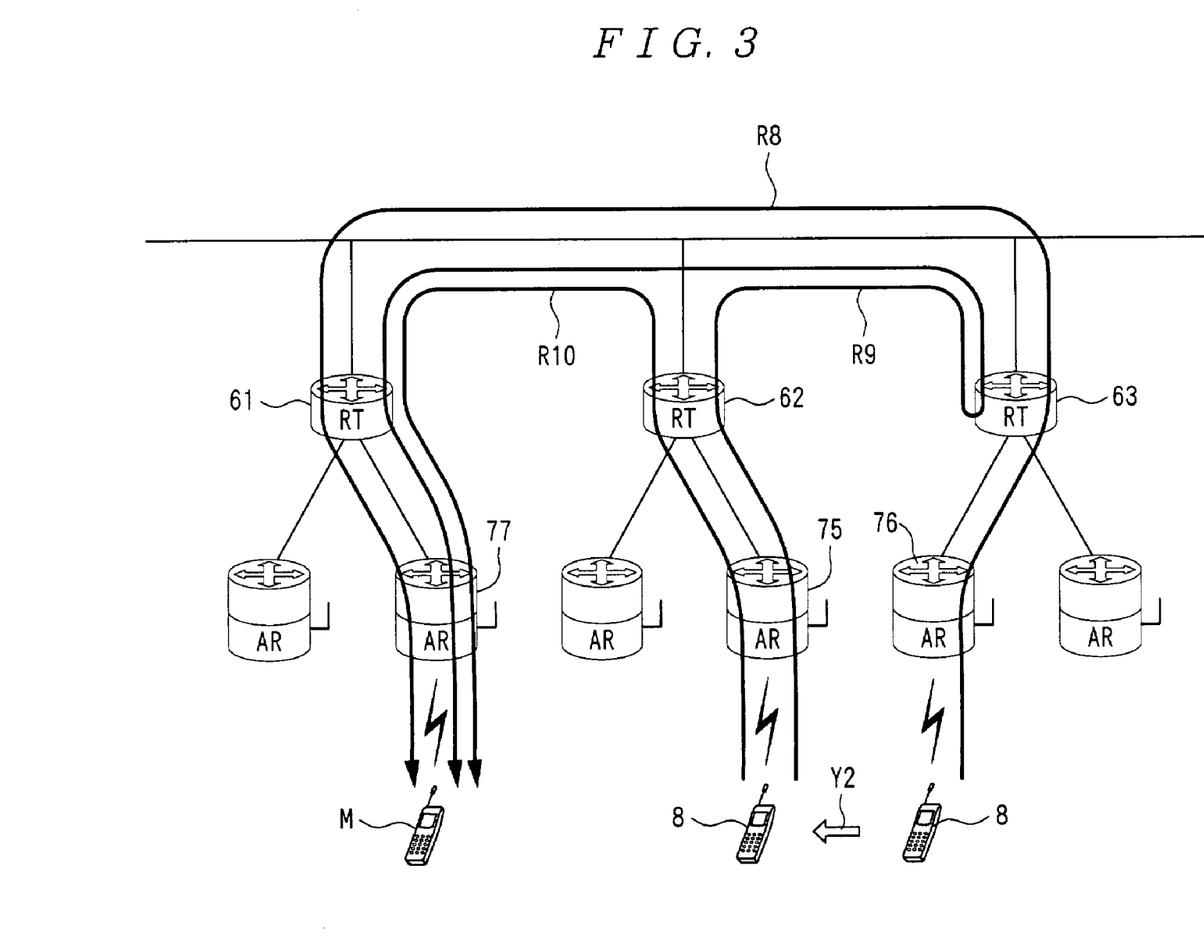
FIG. 3 illustrates how routing takes place if the method of detecting a trigger to rerouting according to the invention is applied to a case in which a CN is in the own network.

FIG. 3 illustrates how routing takes place if the present invention is applied to a case in which a CN is in the own network.

There is shown a situation in which, in the initial state, the mobile communication terminal M is connected to the AR 77 and the CN 8, to the AR 76, and the data routing from the CN 8 to mobile communication terminal M uses an RT 63 as the AncR. Therefore, the data routing from the CN 8 to the mobile communication terminal M in the initial state uses a route R8. In this case, too, as in Embodiment 1, the data destined from the CN 8 to the mobile communication terminal M are capsulated and the initial number of hops is set at the RT 63, which is the AncR, and the AR 77 detects from the reception data the number of hops between the CN 8 and the AR 77 and stores it.

When the CN 8 hands over here the command to the AR 75 as indicated by an arrow Y2, immediately after the handover the data routing from CN 8 to the mobile communication terminal M runs via a route R9 because the AncR still is the RT 63. As the optimal route then is the route R10, the path from the RT 62 to the RT 63 is redundant for the route R9. Then, the AR 77 detects the redundancy of routing by comparing the number of hops obtained from the reception data from the CN 8, and invokes control to optimize the route (reselect an AncR). Since the optimal AncR then is the RT 62, the control to change the AncR to the RT 62 is invoked. For reselection control then, a number of ways are conceivable as described above with reference to Embodiment 1. After AncR reselection to use the RT 62, the routing runs via the route R10, resulting in a switch to the optimal route.

Specific parameters to be used in calculating the number of hops according to the invention include, for instance, a Time To Live (TTL) in IPv4 and a hop limit parameter in IPv6.

Further, regarding the functions and operations of an AR according to the invention, a mobile communication terminal can also have the same functions and operations as the AR except the AR before the mobile communication terminal shifts to hand over the received number of hops that has been acquired to the AR to which the shift was desired for and the AR to which after the mobile communication terminal shifts to receive and store the number of hops received before the shift. Thus, the object of the invention is also attained when the mobile communication terminal acquires the number of hops, compares the currently acquired number of hops with the number of hops acquired in the past and issues an instruction to change the routing to another terminal is changed when the comparison reveals the current number of hops to be greater than the past number of hops.

Figure 4:
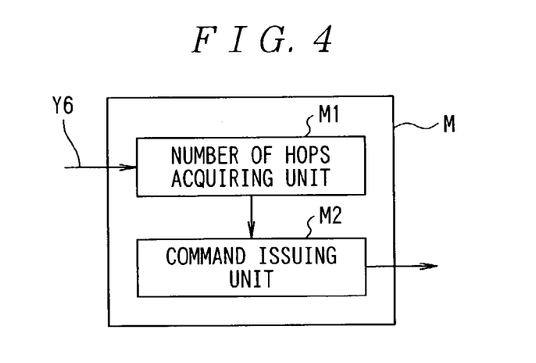
FIG. 4 is a block diagram of the configuration of a terminal for use in an implementation of this method.
Figure 5A:
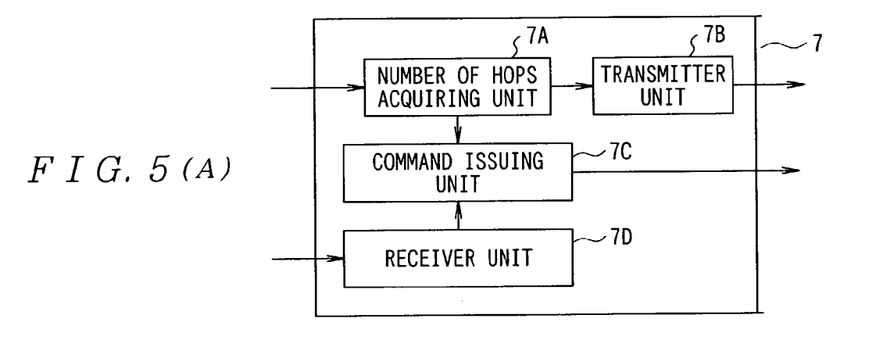
FIG. 5A is a block diagram of a configuration of an access router for use in the implementation of this method.
Figure 5B:
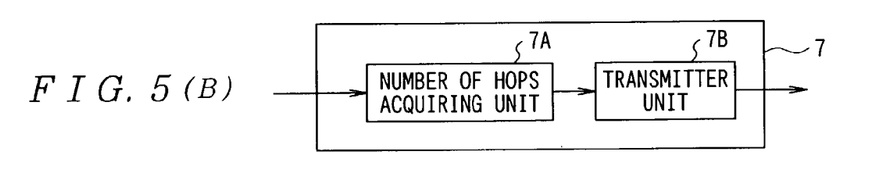
FIG. 5B, a block diagram of a configuration of an access router for transmitting the number of hops to an access router at the destination of shifting.
Figure 5C:
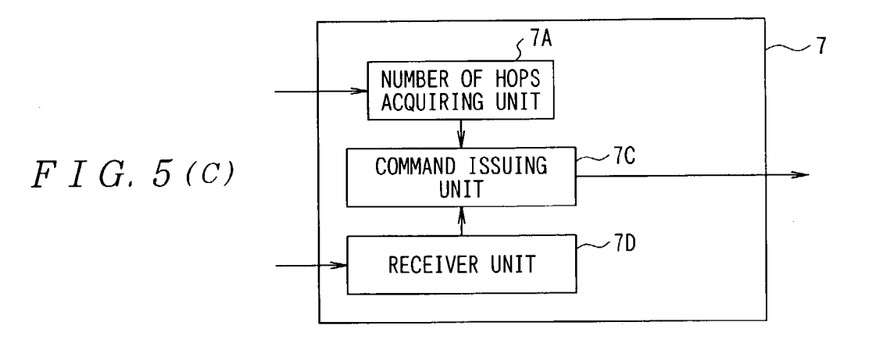
FIG. 5C, a block diagram of a configuration of an access router for receiving the number of hops from an access router in the position before the shift.
Figure 6:
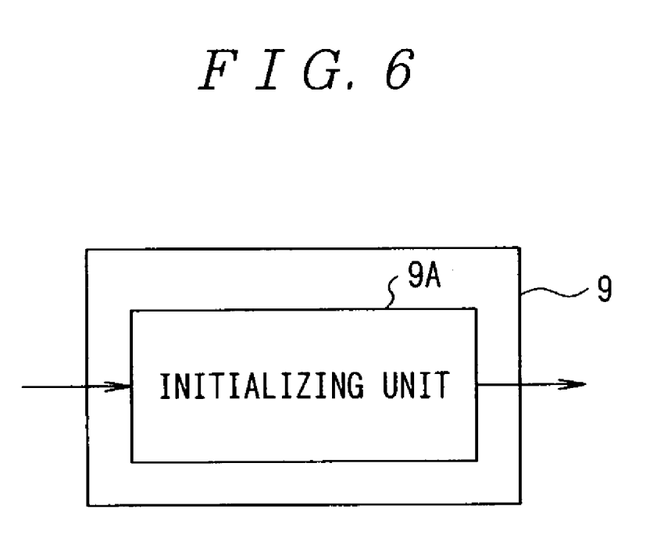
FIG. 6 is a block diagram of a configuration of a router for use in the implementation of this method.

In order to realize the method described above, the terminal can be configured as shown in FIG. 4, or the access router configured as shown in FIG. 5 (A to C), and the router configured as shown in FIG. 6.

Thus, as illustrated in FIG. 4, the terminal M comprises a number of hops acquiring unit M1 and a command issuing unit M2. The number of hops acquiring unit M1 acquires, every time it receives data as indicated by an arrow Y6, the number of hops needed for the reception of the data. The command issuing unit M2 issues an instruction to change the routing to another terminal is changed when the number of hops received by the number of hops acquiring unit M1 proves greater than the number of hops acquired in the past.

Alternatively, an access router 7 may comprise a number of hops acquiring unit 7A, a transmitter unit 7B, a command issuing unit 7C and a receiver unit 7D as shown in FIG. 5A. The number of hops acquiring unit 7A has similar functions to those of the number of hops acquiring unit provided on the terminal. The receiver unit 7D receives the number of hops transmitted from another access router 7. Thus, when the terminal has shifted as described above, the access router 7 to be connected to that terminal will change. In this case, by receiving the past number of hops to be compared with from the access router 7 connected before the shift and making comparison, any redundancy in the routing after the shift can be detected. The transmitter unit 7B transmits, when the terminal under the command of the access router shifts as described above, the number of hops acquired in data communication immediately before the shift, to the other access router 7 which is to compare the number of hops. The command issuing unit 7C compares the number of hops acquired by the number of hops acquiring unit 7A or received by the receiver unit 7D, and issues an instruction to on the basis of the result of comparison as described above. FIG. 5B illustrates the minimum configuration the access router 7 requires when a terminal under its command has shift, and FIG. 5C, that the access router 7 requires when a terminal has been newly connected under its command. Thus, the access router 7 a terminal under whose command has moved out transmits the number of hops acquired by the number of hops acquiring unit 7A through the transmitter unit 7B. The access router 7 under whose command a terminal has been newly connected receives through the receiver unit 7D the number of hops before the shift, transmitted by that access router 7, i.e. the past number of hop, acquires the current number of hops through the number of hops acquiring unit 7A, and compares the current and past numbers of hops using the command issuing unit 7C. Whereas any redundancy in routing can be detected in this manner, in practice an access router 7 of a configuration shown in FIG. 5A is installed in the network.

As shown in FIG. 6, a router 9 includes an initializing unit 9A for setting initial values for parameters in data. The parameters are initialized first and then undated by a router installed between terminals engaged in communication of data to identify the number of hops. These parameters are the hop limit parameter and others as mentioned above. By initializing the number of hops at the router 9, especially the anchor router where the counting starts, having the access router or the like to acquire that parameter perceive the initial value, and acquiring the number of hops on the basis of the variance from the initial value, the number of hops can be acquired accurately.

As hither to described, because an AR or a mobile terminal detects the number of hops from data received in communication and stores it, compares it with the number of hops in new received data and thereby provides a trigger to reselection according to the present invention, eventually it can switch to the optimal route on a substantially real time basis while the mobile terminal is engaged in communication. Furthermore, as the invention can be applied irrespective of whether the communication partner is in another network or in the own network, and as it allows the detection of any redundancy in routing irrespective of the cause of redundancy, whether it is due to the shift of the own terminal, that of the communication partner or to any other factor, the resources in the network can be utilized more effectively by eliminating redundant routing.

What is claimed is:

1. A method of reducing the number of hops between a first terminal and a second terminal through a plurality of routers for relaying data, the method comprising:

when at least one of the first terminal and the second terminal is a mobile terminal and the mobile terminal moves, comparing the number of hops on a data transmission path acquired in the past between the first terminal and the second terminal before the mobile terminal moves to that on a data transmission path currently acquired between the first terminal and the second terminal after the mobile terminal moves; and if the comparing step indicates that the number of hops on the data transmission path currently acquired is greater than that on the data transmission path acquired in the past, starting rerouting of the data transmission path between the first terminal and the second terminal to select a new path that makes the number of hops on the new path smaller than that of the data transmission path currently acquired between the first and second terminals;

wherein when the data transmission path is rerouted, data of the number of the hops is handed over by any one of:

direct transmission of the data from an access router accessed by the mobile terminal before the mobile terminal moves to another access router accessed by the mobile terminal after the mobile terminal moves;

transmission of the data via another router; and transmission of the data via the mobile terminal.

2. The method according to claim 1, wherein when at least two of the plurality of routers serve as anchor routers to perform data transmission, respectively, one of the anchor routers is changed to another anchor router to select the new path at the step of starting rerouting, when the mobile terminal moves.

3. The method according to claim 1, wherein the comparing step compares at the mobile terminal the number of hops of the data transmission path of data received in the past at either of the first terminal or the second terminal to that of the data transmission path of the data currently acquired after the mobile terminal moves.

4. The method according to claim 1, wherein said number of hops is acquired on a basis of parameters in the data, the parameters being updated by routers between the first terminal and the second terminal during a time they communicate, by obtaining variances between values of the parameters at a starting point of counting the number of hops and values of the parameters at an ending point of counting, and specifying the number of used routers corresponding to those variances.

5. The method according to claim 4, wherein said parameters are initialized at said starting point, and said variances are acquired on a basis of the initial values.

6. A communication system for reducing the number of hops between a first terminal and a second terminal through a plurality of routers for relaying data, the communication system comprising:
when at least one of the first terminal and the second terminal is a mobile terminal and the mobile terminal moves, a comparing unit for comparing the number of hops on a data transmission path acquired in the past between the first terminal and the second terminal before the mobile terminal moves to that on a data transmission path currently acquired between the first terminal and the second terminal after the mobile terminal moves; and
if the comparing unit indicates that the number of hops on the data transmission path currently acquired is greater than that on the data transmission path acquired in the past, an optimizing unit for starting rerouting of the transmission path of data between the first terminal and the second terminal to select a new path that makes the number of hops on the new path smaller than that of the data transmission path currently acquired between the first and second terminals;
wherein when the data transmission path is rerouted, data of the number of the hops is handed over by any one of:
direct transmission of the data from an access router accessed by the mobile terminal before the mobile terminal moves to another access router accessed by the mobile terminal after the mobile terminal moves;
transmission of the data via another router; and
transmission of the data via the mobile terminal.

7. The communication system according to claim 6, wherein each of the first terminal and the second terminal comprises:
an acquiring unit that acquires the number of hops; and
an issuing unit that issues an instruction for rerouting to select a new path that makes the number of hops between the first and second terminals smaller than that currently acquired, if the number of hops currently acquired is greater than that acquired in the past.

8. The communication system according to claim 6, wherein at least two of the routers are access routers; and wherein each of the access routers comprises:
an acquiring unit that acquires the number of hops; and
an issuing unit that issues an instruction for rerouting to select a new path that makes the number of hops between the first and second terminals smaller than that currently acquired, if the number of hops currently acquired by said acquiring unit is greater than that acquired in the past.

9. The communication system according to claim 8, wherein each of the access routers further comprises a receiver unit that receives the number of hops acquired by another router in the past; and
wherein said issuing unit issues an instruction for rerouting to select the new path that makes the number of hops between the first and second terminals smaller than that currently acquired, if the number of hops currently acquired by said acquiring unit is greater than that acquired in the past by said receiver unit.

10. The communication system according to claim 8, wherein each of the access routers further comprises a transmitter unit that transmits the number of hops acquired by said acquiring unit to a comparator of a different access router that detects any increase in the number of hops for communication between the first terminal and the second terminal on a basis of the acquired number of hops.

11. The communication system according to claim 6, wherein at least two of the routers are anchor routers; and
wherein each of the anchor routers comprises an initializing unit for initializing parameters in data, so that the initialized parameters are updated to specify the number of hops between the first and second terminals.

* * * * *